June 4, 1968  F. J. KOVAC ET AL  3,386,486
TIRES

Filed Oct. 22, 1965  2 Sheets-Sheet 1

INVENTORS
FREDERICK J. KOVAC
GROVER W. RYE
BY J. B. Holden
ATTORNEY

INVENTORS
FREDERICK J. KOVAC
GROVER W. RYE
BY J. B. Holden
ATTORNEY

United States Patent Office 3,386,486
Patented June 4, 1968

3,386,486
TIRES
Frederick J. Kovac, Akron, and Grover W. Rye, Cuyahoga Falls, Ohio, assignors to The Goodyear Tire & Rubber Company, Akron, Ohio, a corporation of Ohio
Filed Oct. 22, 1965, Ser. No. 500,958
1 Claim. (Cl. 152—354)

ABSTRACT OF THE DISCLOSURE

The invention relates to a pneumatic tire in which the carcass plies terminate short of the beads and bead plies overlap the edges of the carcass plies. In the preferred structure the body plies are bias plies of giant cords and the bead plies are radial plies composed of filaments and the edges of the body plies and bias plies are sandwiched between one another.

---

This invention relates to a pneumatic tire. It may be a tubeless tire or a tire with a tube. It may be of radial-ply construction or bias-ply construction. Thus it applies to pneumatic tires of all types.

According to this invention, the tire carcass is formed of one or more body plies which contain reinforcing cords, wires, filaments or the like. These plies extend under the tread area and down toward the beads but are not turned around the beads. Usually they treminate in the bead areas. This reinforcement is supplemented by one or more bead plies. These bead plies extend under the bead and their edges overlap the respective edges of the body ply or plies. They extend only a short distance into the sidewall areas of the tire so as to overlap the edges of the body plies. All carcass plies may be of this type, or there may also be one or more carcass plies which extend from bead to bead and are turned under both beads.

Of the various advantages of this construction, there are two that are particularly important. In the first place, the tires of this construction are not as noisy as other tires. In the second place, if giant cords are used in the carcass, the plies containing them are so stiff that it is difficult for the tire builder to turn them around the beads. The edges of these stiffer plies stop short of turning under the beads, and bead plies of softer fabric are turned under the beads with their edges overlapping the edges of the stiffer plies.

In the normal operation of a vehicle, vibrations from the road surface are transmitted through the tires to the wheels and subsequently to the interior of the vehicle causing noise which can be objectionable. The noise transmitted is a function of the type of reinforcing member and the continuity of the tire structure. Through the construction outlined in this disclosure, this path of transmission is interrupted resulting in appreciable reduction in noise. Although the interruption may be at almost any place in the ply structure, it is preferably located away from any center of fatigue, and it is thus preferably located in the bead area. Interruption just before the ply contacts the bead is most desirable. This construction also allows the use of different reinforcing elements in the body plies and bead plies, the fabrics being selected for their lack of ability to generate and transmit noises, as well as other properties.

It is characteristic of nylon reinforced carcasses that they transmit noise in a lower frequency than carcasses reinforced with rayon. Conversely, rayon will transmit noise more effectively at higher frequencies than nylon. Noise transmitted at both frequencies can be objectionable, but by building a tire utilizing one fabric for the body and a different fabric for the bead plies, the intensity of the noise at any given frequency can be reduced, and both high and low frequencies can be dampened, resulting in a quiet tire.

Some tires are reinforced with so-called giant cords, that is, cords in excess of about .037 gauge, because of their strength and also in order to reduce the number of plies required and this reduces the cost of tire building. Bead plies used with body plies of giant cords need not necessarily be reinforced with cords but may be reinforced with filaments or wires. The use of both body and bead plies not only facilitates incorporating the bead in the carcass, but also reduces noise transmission.

The invention is further described in connection with the accompanying drawings, in which—

Figure 1:
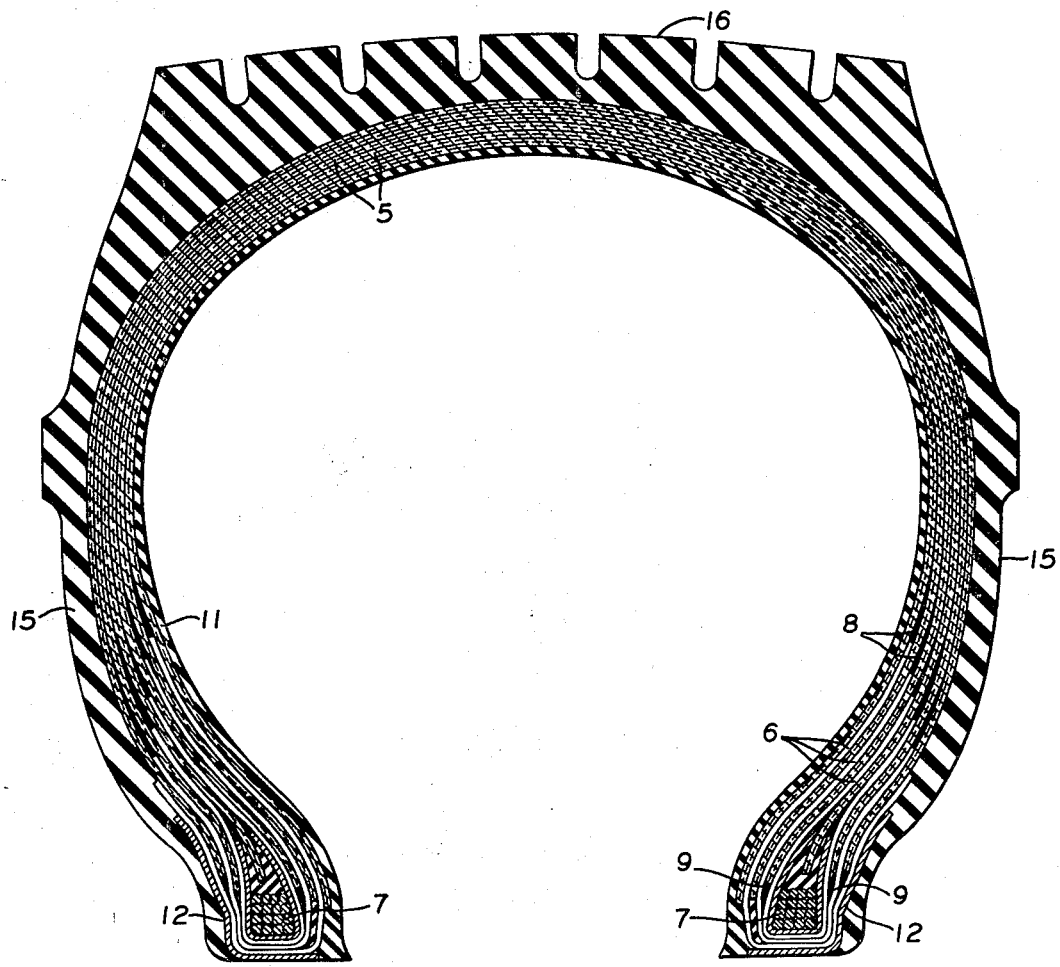
FIGURE 1 is a section through a tire in which all of the body reinforcing plies stop short of turning under the bead.
Figure 2:
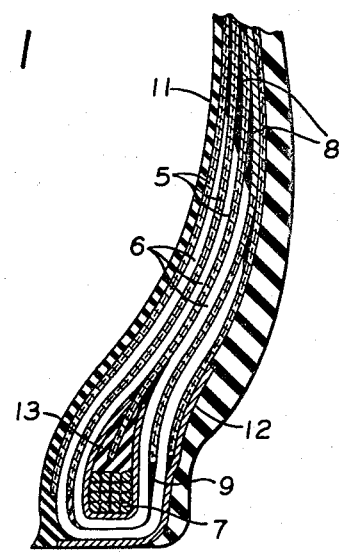
FIGURE 2 is an enlarged detail of one of the bead areas of the tire shown in FIGURE 1 except that it refers to a four-ply tire instead of a six-ply tire.

The tire of FIGURE 1 is made with bias plies 5. These are body plies. They extend to the general bead area, but are not turned around the beads 7. The edges of the bead plies 6 overlap the edges of the body plies and are sandwiched between them. Fillets 8 and 9 extend in opposite directions from the edges of the respective plies. These bead plies are usually radial plies, as shown, but may be bias plies.

The other details of the construction are immaterial. An inner liner 11, flippers 12 and fillers 13 are shown. Normally there will be breakers, etc. The sidewalls 15 and tread 16 are of any suitable construction.

Figure 3:
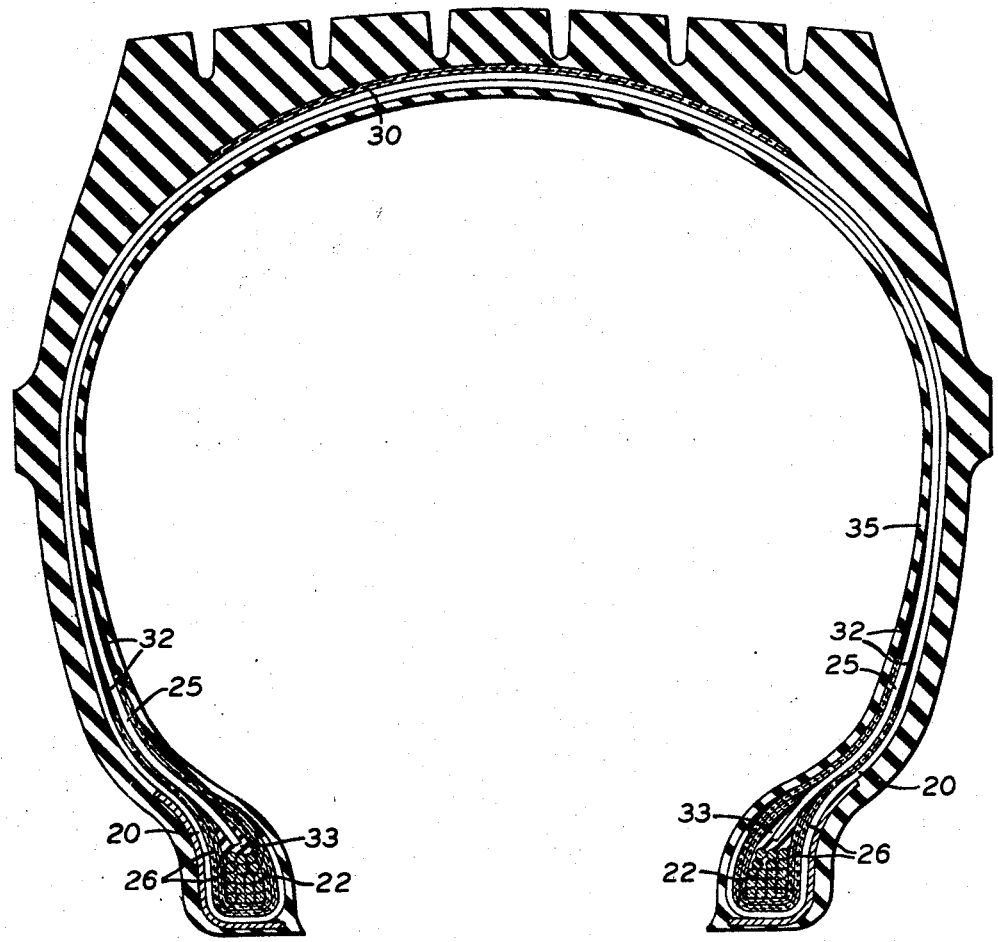
FIGURE 3 is a section through a tire of modified construction.

The tire of FIGURE 3 is a radial tire. The edges of the inner ply 20 are turned up under the beads 22, in a usual manner. The outer ply is composed of two parts: (1) a body ply 25 the eddges of which extend into the bead areas, but are not turned under the beads; and (2) bead plies 26 which extend under the beads with their edges overlapping the edges of the body plies. The edges of the bead ply outside of the beads may be either inside or outside of the respective edges of the body ply. The belt 30 is of usual construction. Fillets 32 and fillers 33 of the usual types are shown. The inner liner 35 is of usual composition. Other details of the construction may be usual.

The body ply 25 may be composed of giant cords, with the bead plies being composed of smaller cords. Alternatively, they may be of the same size, and the cords in each may be of the same composition or different compositions. The body ply may be of wire and the bead plies may be reinforced with fabric or filament.

The invention is covered in the claim which follows.
What we claim is:
1. A pneumatic tire reinforced with a plurality of bias body plies, all of which extend across the entire tread and are composed of cords of at least .037 gauge, the edges of all of the body plies terminating short of being turned under the beads with a plurality of bead plies which are radial plies composed of filaments and are located at least partially in each bead areas, which bead plies are turned under the beads and each edge of each body ply is overlapped by at least one edge of an adjacent bead ply with no more than one edge of a bead ply between any two body plies and no more than one edge of a body ply between any two bead plies.

References Cited

UNITED STATES PATENTS

| | | | |
|---|---|---|---|
| 2,937,684 | 5/1960 | Rockoff | 152—362 |
| 2,966,933 | 1/1961 | Boussu et al. | 152—362 |
| 3,062,259 | 11/1962 | Boussu et al. | 152—356 |
| 3,254,694 | 6/1966 | Sparks | 152—362 |

ARTHUR L. LA POINT, *Primary Examiner.*

Y. P. SCHAEVITZ, *Assistant Examiner.*